United States Patent [19]

Fukuhara

[11] Patent Number: 5,186,875
[45] Date of Patent: Feb. 16, 1993

[54] METHOD OF MANUFACTURING OF A NOVEL HOLLOW MULTI-LAYER ARTICLE

[75] Inventor: Keiji Fukuhara, Hiroshima, Japan

[73] Assignee: Mazda Motor Corporation, Hiroshima, Japan

[21] Appl. No.: 668,315

[22] Filed: Mar. 11, 1991

Related U.S. Application Data

[63] Continuation of Ser. No. 182,458, Apr. 18, 1988, abandoned.

[30] Foreign Application Priority Data

Apr. 17, 1987 [JP] Japan ................... 62-94922

[51] Int. Cl.⁵ ..................... B29C 49/04; B29C 49/22
[52] U.S. Cl. .................... 264/37; 264/173; 264/514; 264/515; 425/132; 425/133.1; 425/523
[58] Field of Search ............ 264/37, 514, 515, 167, 264/171, 173, 177.1; 425/133.1, 523, 131.1, 132, 145, 149, 532

[56] References Cited

U.S. PATENT DOCUMENTS

| | | | |
|---|---|---|---|
| 3,357,049 | 12/1967 | Spindler | 425/146 |
| 3,712,772 | 1/1973 | Hunkar | 425/141 |
| 3,746,486 | 7/1973 | Koster | 425/146 |
| 3,820,928 | 6/1974 | Lemelson | 425/146 |
| 4,011,493 | 3/1977 | Fukase et al. | 318/568 |
| 4,056,344 | 11/1977 | Lemelson | 425/132 |
| 4,120,633 | 10/1978 | Feuerherm | 425/462 |
| 4,185,954 | 1/1980 | Murakami et al. | 425/462 |
| 4,297,092 | 10/1981 | Goron | 425/133.1 |
| 4,302,170 | 11/1981 | Goron | 425/133.1 |
| 4,405,557 | 9/1983 | Lehnard | 264/515 |
| 4,422,838 | 12/1983 | Iwawaki et al. | 425/376 A |
| 4,472,129 | 9/1984 | Siard | 425/381 |
| 4,512,943 | 4/1985 | Hahn et al. | 264/173 |
| 4,522,775 | 6/1985 | Briggs et al. | 264/173 |
| 4,565,515 | 1/1986 | Maier | 425/381 |
| 4,578,025 | 3/1986 | Ando et al. | 425/133.1 |
| 4,717,326 | 1/1988 | Motonaga et al. | 425/133.1 |
| 4,798,526 | 1/1989 | Briggs et al. | 264/515 |
| 4,824,618 | 4/1989 | Strum et al. | 264/37 |
| 4,907,957 | 3/1990 | Nakagawa et al. | 425/133.1 |

FOREIGN PATENT DOCUMENTS

| | | |
|---|---|---|
| 52-37026 | 9/1977 | Japan . |
| 55-39448 | 10/1980 | Japan . |
| 58-220738 | 12/1983 | Japan . |
| 60-187513 | 9/1985 | Japan . |

*Primary Examiner*—Jan H. Silbaugh
*Assistant Examiner*—Catherine Timm
*Attorney, Agent, or Firm*—Keck, Mahin & Cate

[57] ABSTRACT

A method of manufacturing a multi-layer hollow article which consists of extruding a multi-layer parison having at least a chief resin layer, a sub resin (barrier) layer, and an adhesive resin layer located between the chief resin layer and the sub resin layer. The adhesive resin layer is made of the same essential material as the chief resin material and of the same quality. The sub resin layer is cut off by the use of a raised extrusion pressure of the adhesive resin when the multi-layer parison has been extruded a predetermined length. The parison is received in a mold so that the cut off sub resin (barrier) layer lies within the mold below pinch offs. Flash is produced as a result of the molding. The flash consists of the chief resin material or the chief resin material and the adhesive resin material. The flash is recycled as part of the chief resin material. Collecting a flash of a hollow article made by a blow molding and rebirthing the flash a rebirth chief resin material.

7 Claims, 6 Drawing Sheets

METHOD OF MANUFACTURING OF A NOVEL HOLLOW MULTI-LAYER ARTICLE

This application is a continuation of application Ser. No. 07/182,458, filed Apr. 18, 1988, now abandoned.

BACKGROUND OF THE INVENTION

1. Field of the Invention

The present invention relates generally to a novel method of manufacturing a novel multi-layer hollow article and, more particularly, to a method of manufacturing a hollow article having at least three layers of three kinds of resin or polymeric materials by the use of an extrusion molding technique and a blow molding technique.

2. Description of Prior Art

Conventionally, a hollow article composed of a resin material is generally formed through a blow molding process in which a pressurized gas is blown into a parison inserted into a set of molds. Sometimes a multi-layer parison having a plurality of resin layers laminated together has been employed in the blow molding process, the multi-layers complementing insufficient properties for a molded product of a single resin material.

In a fuel tank made of a resin material, such as high-density polyethylene, for example, a problem of gasoline permeation exists in which the gasoline stored within the tank tends to permeate through the tank wall. Japanese Patent Publication (Tokkosho) No. 55-39448 discloses a hollow article having a plurality of resin layers laminated together and formed from a parison by the use of a blow molding technique to deal with this problem. More specifically, the aforementioned multi-layer parison is formed using an extrusion molding process. The multi-layer parison has an inner barrier resin layer composed of a sub resin, such as a nylon resin, for preventing the gasoline from permeating through the tank wall, an outer resin layer composed of a chief resin, such as a high-density polyethylene, and an intermediate adhesive resin layer. The adhesive resin layer is formed between the inner barrier resin layer and the outer resin layer and securely bonds the inner barrier resin layer to the outer resin layer. Accordingly, the hollow article is formed from the parison by the use of a known blow molding technique and has three resin layers of three different kinds of resin materials.

When making such a hollow article by the use of a blow molding technique, an outer portion of the parison is jutted out or projected from the cavity of the blow mold toward the outside of the blow mold creating a flash. Thereafter, when the parison becomes hard, this flash must be removed. It is desired that the flash be recycled for a cost savings and effective use of material. However, the flash of the hollow article includes both the nylon sub resin material as well as the polyethylene chief resin material. The nylon resin is of low heat stability and is not related chemically to the high-density polyethylene. Thus, the articles formed by the use of the recycled resin material experience problems due to low mechanical strength and opaqueness. As a consequence, generally the flash is not recycled.

SUMMARY OF THE INVENTION

Accordingly, the present invention has been developed with a view to substantially eliminating the above described disadvantages inherent in the prior art extrusion molding method, and has as its essential object the provision of an improved manufacturing process of a novel multi-layer hollow article.

Further, another object of the invention is to provide a process capable of extruding and blow molding a multi-layer hollow article using recycled resin composed of flash and to provide a novel article as a result.

The aforementioned objects are accomplished according to the present invention by providing a process of manufacturing a novel multi-layer hollow article which comprises the steps of extruding a multi-layer parison having at least a layer of a chief resin material, a layer of a sub resin material, and a layer of an adhesive resin between the layer of the chief resin material and the layer of the sub resin material, the adhesive resin being related to and of the same quality as the chief resin material, cutting off the sub resin material by the use of a raised extrusion pressure of the adhesive resin when the multi-layer parison is extruded a predetermined length from an accumulator head, holding the parison by the blow molds, blow molding the parison, collecting flash from the hollow article formed by the molding and recycling the flash composed essentially of the chief resin material.

In accordance with the present invention, when the multi-layer parison is extruded a predetermined length, the extrusion pressure of the adhesive resin is raised a predetermined amount to cut off the sub resin material layer. In this state, the adhesive resin layer interacts with the sub resin material layer due to the restriction pressure of the chief resin layer resulting in the sub resin layer being cut off. Accordingly, the flash of the resulting hollow article does not include the sub resin material, but only the chief resin material and the adhesive resin which, in the present invention, is composed of resin material chemically related to and of the same quality as the chief resin material. Therefore, the recycled resin material of the flash comprises essentially the chief resin material.

BRIEF DESCRIPTION OF THE DRAWINGS

These objects and features of the present invention will become apparent from the following description taken in conjunction with the preferred embodiment thereof with reference to the accompanying drawings. Throughout the figures, like parts are designated by the same reference numerals.

DETAILED DESCRIPTION OF THE PREFERRED EMBODIMENT

Figure 1:
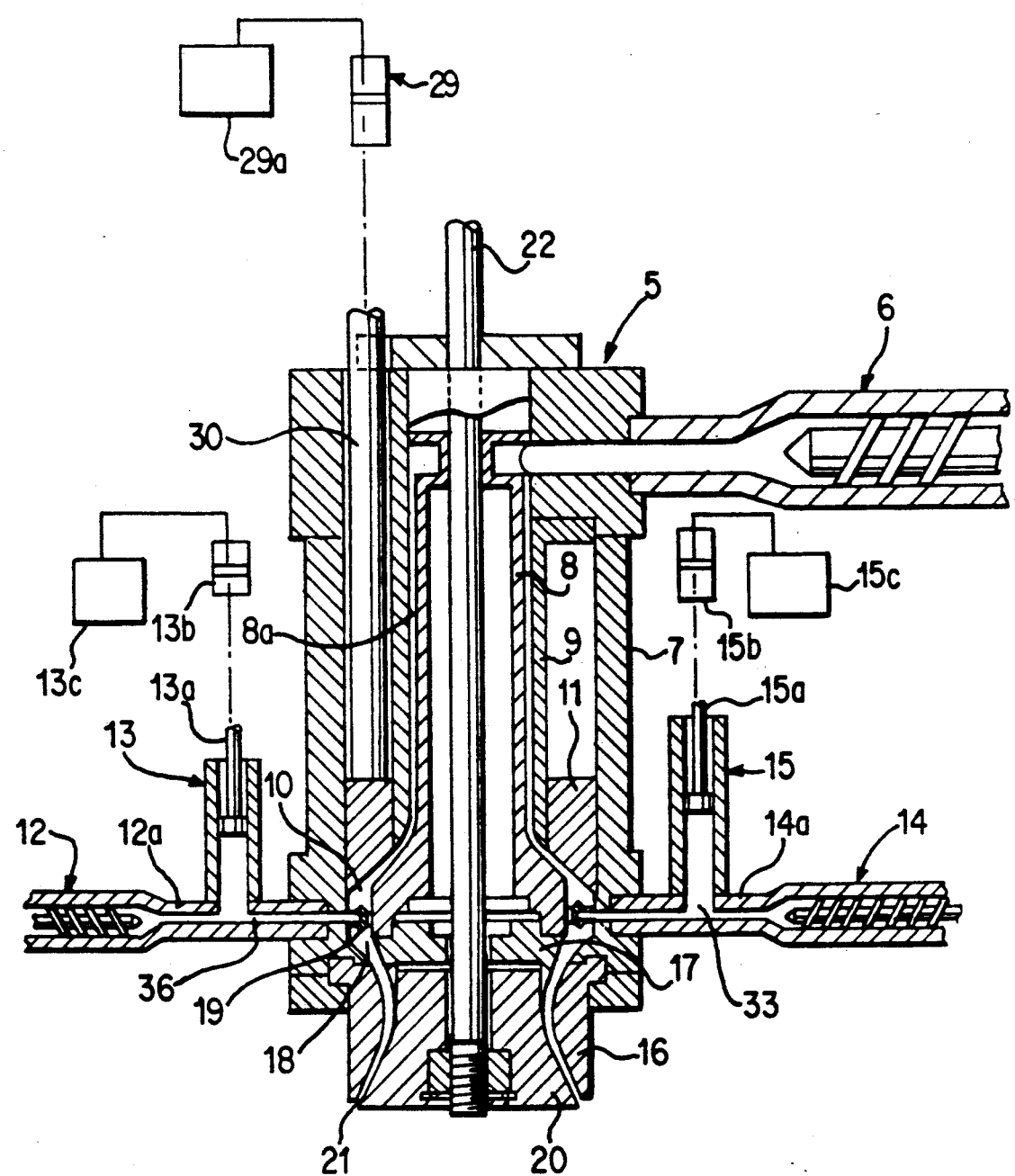
FIG. 1 is a vertical sectional view of extrusion molding equipment used in the method of the present invention.

The invention will now be described by way of example with reference to the accompanying drawings. FIGS. 1 to 5 are illustrations used for explanation of a first embodiment of the method or process of manufacturing the novel multi-layer hollow article according to the present invention. Referring to FIG. 1, an extrusion molding equipment is provided with an accumulator head 5 having an annular cylindrical member 7 forming the exterior lower half of the accumulator head 5. An annular cylindrical shell 9 is positioned within member 7 but spaced inwardly therefrom to define an annular cylindrical space 9a. A ringed or annular piston 11 reciprocates up and down along the inner peripheral surface of the cylindrical member 7 in space 9a. A first annulus or core 8 penetrates the ringed piston 11 and is fixedly mounted relative to the cylindrical members 7 and 9 at the central portion of the accumulator head 5. Core 8 is spaced inwardly of shell 9 and defines an annular cylindrical space 8a. A resin storing space 10 internally accommodating the ringed piston 11 is defined between the cylindrical member 7 and the first core 8, and is in communication with space 8a. A chief resin material, for example, high-density polyethylene resin, is sequentially extruded from a first extruder 6, in a melting state, and is supplied via duct 6a into an annular space 8b defined by a groove in the top of core 8. The annular space 8a communicates with space 8b and leads resin into resin storing space 10.

An annular die 16 is coaxially fixedly mounted on the lower end of the cylindrical member 7. A second core 20, coaxially disposed with respect to the die 16, is in sliding engagement with an annular core support 17 at its central portion thereof and is reciprocal in a vertical or axial direction. The core support 17 is securely mounted on the first core 8 at the lower end thereof.

Both of the die 16 and the second core 20 are conically formed at the inner peripheral surface of the lower end of the die 16 and at the outer peripheral surface of the lower end of the second core 20 to form an annular die slot or slit 21 therebetween. The die slit 21 communicates with the aforementioned resin storing space 10 through an annular resin passage 18 defined by the cylindrical member 7 and the die 16, on the one hand, and the first core 8, on the other hand. An actuating rod 22 freely penetrates core support 17 and is threaded into and fixed to the second core 20. Reciprocally moving in a vertical or axial direction, the rod 22 through a connection to a hydraulic cylindrical member (not shown) varies the opening of the die slit 21 defined between die 16 and the second core 20 to control its width, i.e., its thickness in a radial direction thereof.

When the chief resin material has been received in the accumulator head 5, the piston 11 is fully retracted into annular space 9a. To activate the ringed piston 11, it is downwardly moved by a first extrusion cylinder 29 comprising a single-acting hydraulic cylinder operating through a first plunger 30. Chief resin material stored within the resin storing space 9a and 10 is forcibly fed to the die slit 21 when the first extrusion first plunger 30 is actuated.

Figure 5A:
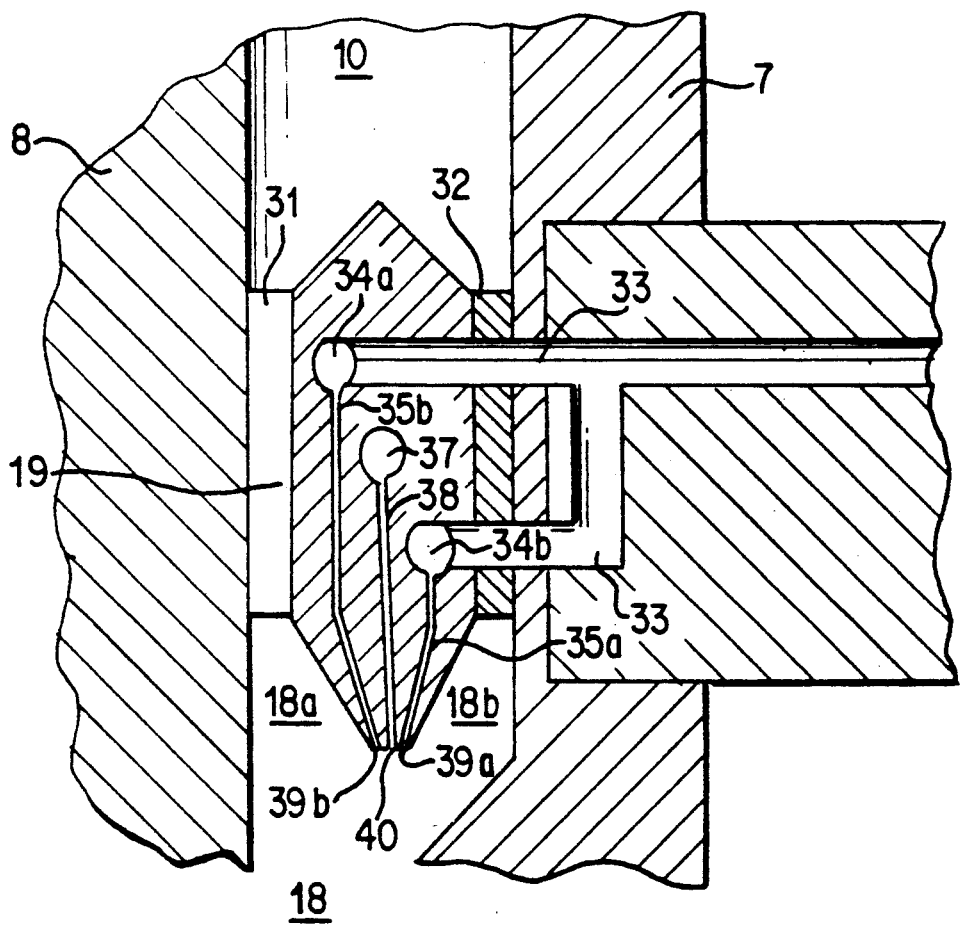
FIGS. 5A and B are cross-sectional views of a portion of FIG. 1, on an enlarged scale.
Figure 5B:
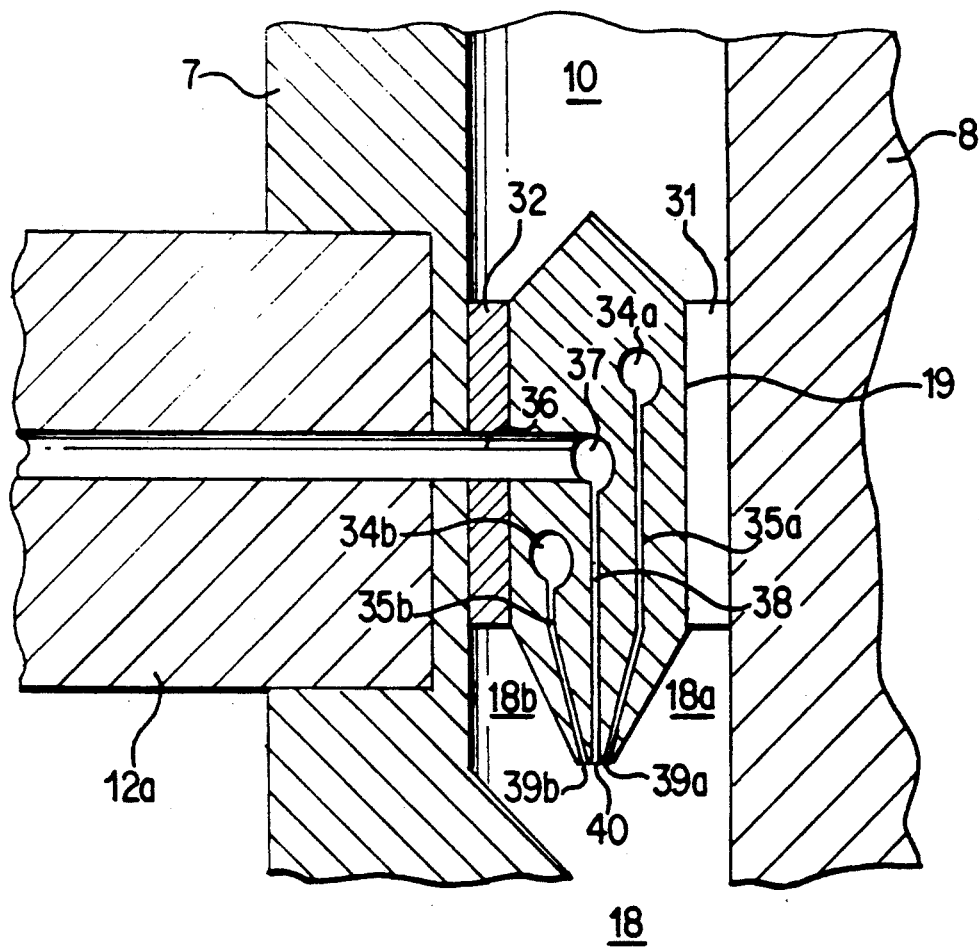

As shown in FIGS. 5A and 5B, a ringed or annular member 19, having a cross section approximately similar to that of an elongated hexagon, is coaxially mounted in the resin storing space 10 just upstream of the resin passage 18. The ringed member 19 is securely supported from the inner peripheral surface of the cylindrical member 7 by peripherally spaced first blocks or members 32 spaced at regular intervals, and from the outer peripheral surface of the first core 8 by peripherally spaced second blocks or support members 31 also spaced at regular intervals but at interleaved positions relative to those of the first support members 32. The member 19 divides the annular passage from the resin storing space 10 into two concentric radially spaced passages, such that the downstream side of member 19 defines an inside annular resin passage 18a and an outside annular resin passage 18b.

The ringed member 19 is internally provided with an annular resin conduit 37 for the barrier resin material, for example, nylon resin material for preventing gasoline from permeating through the wall of the final product. Conduit 37 is formed substantially at the central portion of member 19. Two annular resin conduits 34a and 34b for the adhesive resin, for example, modified polyethylene resin, are formed on respective sides (radially) of the barrier resin conduit 37 and axially displaced upstream and downstream. These resin conduits 37, 34a and 34b communicate with three coaxially defined annular injection openings or nozzles 40, 39a and 39b formed at the lower end or portion of the ringed member 19, respectively, by way of annular slots or slits 38, 35a and 35b.

The barrier resin conduit 37 communicates with a second extruder 12 disposed outside the accumulator head 5, by way of a barrier resin conduit 36 defined in the member 12, member 7, one of the first support members 32 arranged between the ringed member 19 and the cylindrical member 7, and the ringed member 19. Member 12 is fixed in member 7. A second accumulator 13 is arranged at the forward end of the second extruder 12 for temporarily storing therein the barrier resin in the melting state, sequentially extruded from the second extruder 12, and for injecting the resin by operating a second plunger 13a which is operated downwardly by a second extrusion cylinder 13b comprising a single-acting hydraulic cylinder. Resin extruded by accumulator 13 is fed through conduit 36 to conduit 37.

Both of the adhesive resin conduits 34a and 34b communicate with a third extruder 14 disposed outside the accumulator head 5, by way of a bifurcated adhesive resin conduit 33 defined, respectively, in member 19, one of the first support members 32, member 7 and a block 14a to which extruder 14 is connected. A third accumulator 15 communicating with conduit 33 is also arranged at the forward end of the third extruder 14 for temporarily storing therein the adhesive resin sequentially extruded from the third extruder 14 and for injecting the resin via conduit 33 by operating downwardly a third plunger 15a which is operated downwardly by a third extrusion cylindrical extrusion member 15b comprising a single-acting hydraulic cylinder.

Position detecting means 15c connected to the cylindrical member 15b detects the operating position and state of the third plunger 15a by way of the cylindrical member 15b. Similarly, the respective cylindrical members 29 and 13b are connected to position detecting means 29a and 13c to detect the operating position and state of respective plungers 30 and 13a. Position detecting means 15c, 29a and 13c are known in the art and any conventional apparatus suitable to perform this function can be used.

Figure 2:
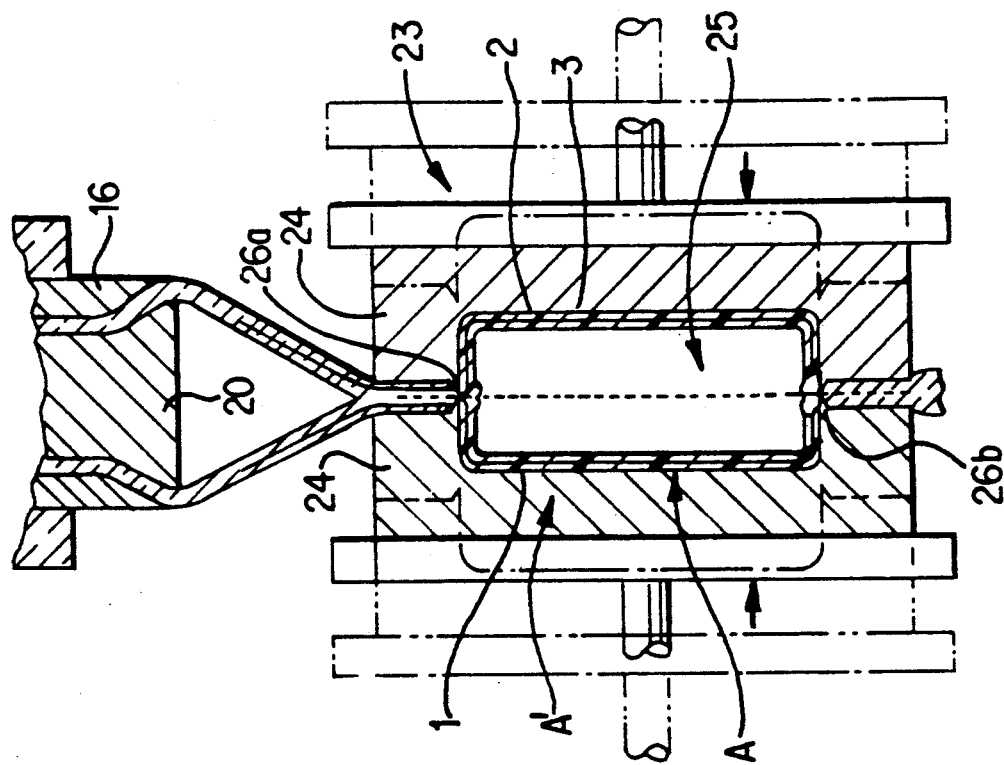
FIG. 2 is a vertical sectional view of a blow mold showing the molding step according to the present invention.

As shown in FIG. 2, a blow mold 23 composed of a pair of molds 24 defining a mold cavity 25 are situated below the accumulator head 5 and die 16. The blow mold 23 has upper and lower pinch portions 26a and 26b for pinching the parison when the blow mold 23 is closed. During molding, pressurized gas is admitted to the mold cavity in a known way to force the parison against the walls of the cavity. Essentially any known blow molding apparatus can be used.

Figure 3:
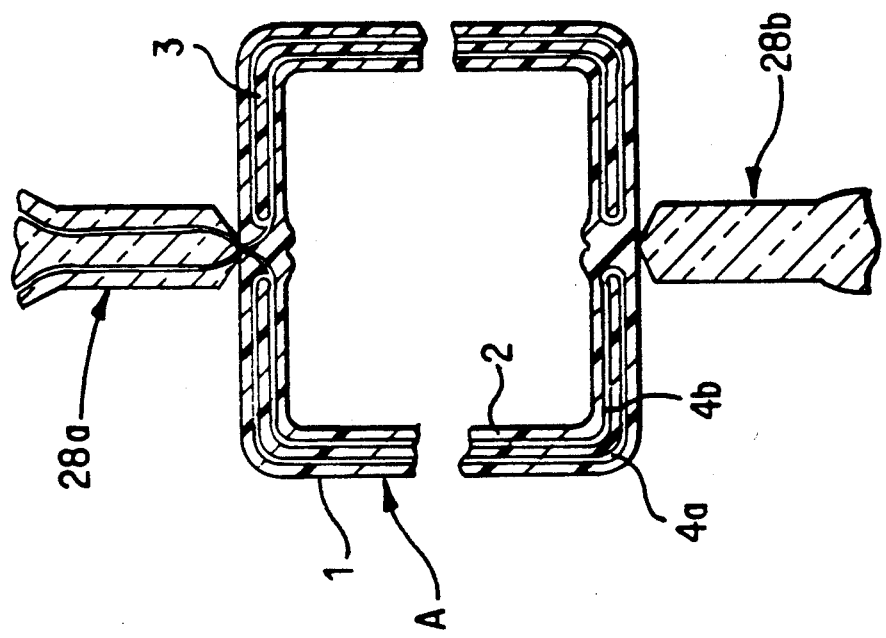
FIG. 3 is a vertical sectional view of a novel multi-layer fuel tank illustrating features of the present.
Figure 4A:
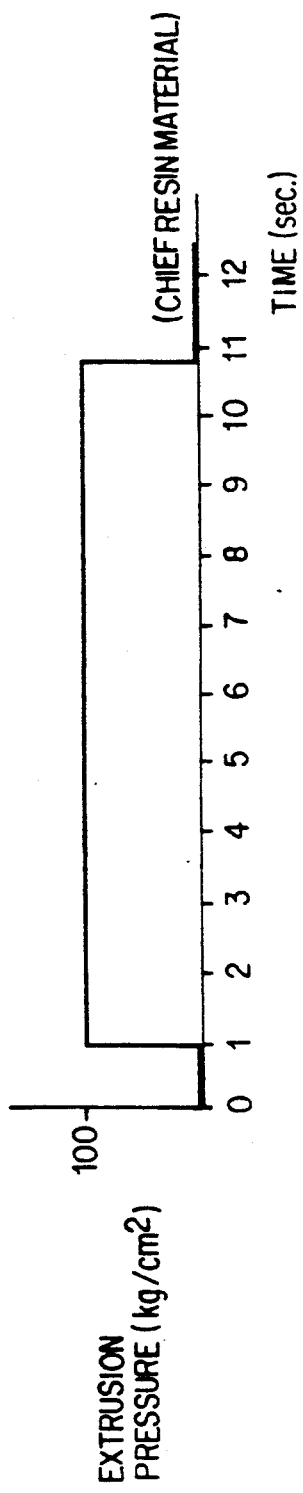
FIGS. 4A, B, and C are timing charts indicating extrusion pressures.
Figure 4B:
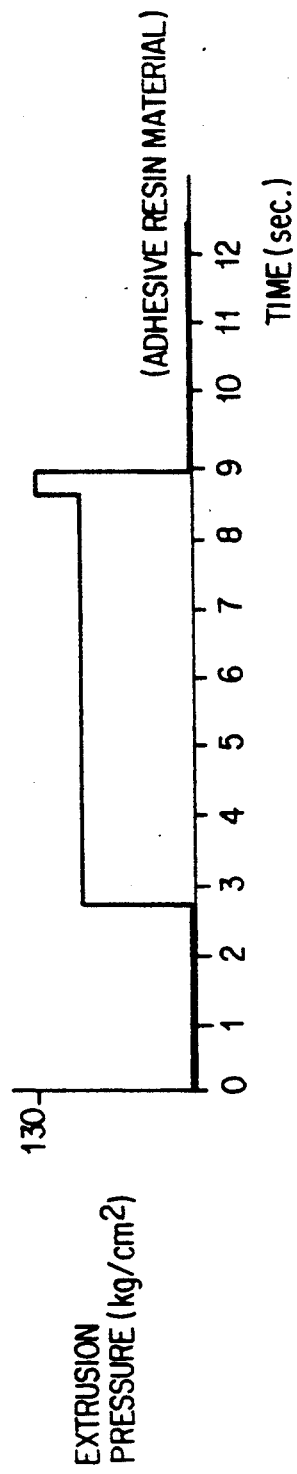
Figure 4C:
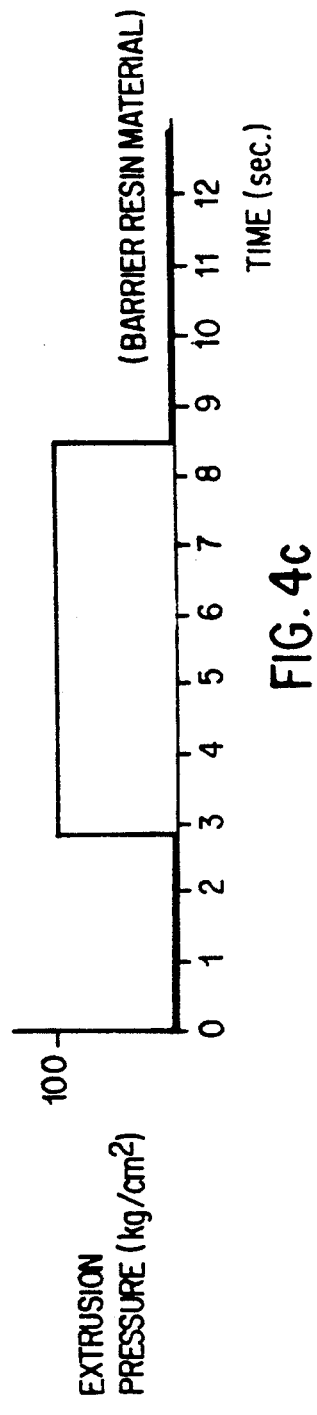

The manufacturing process for a multi-layer hollow article having the construction as described and carried out according to the teachings of the invention will now be explained. First, the chief resin material is fed by extruder 6 via passages 6a and 8a into the resin storing space 10 and 9a by forcing the ringed piston 11 to rise in space 9a. In the same manner, the barrier resin and the adhesive resin, respectively, are extruded from the second and third extruders 12 and 14 and are stored in the second and third accumulators 13 and 15 by forcing the second plunger 13a and the third plunger 15a to rise in respective accumulators 13 and 15. Thereafter, when the respective resin materials are stored in predetermined amounts within the resin storing space 10 and the respective accumulators 13 and 15, the first plunger 30 is lowered by the lowering operation of the first extrusion cylindrical member 29, lowering in turn the ringed piston 11. The chief resin material within the resin storing space 10 and space 9a is forcibly fed towards the annular resin passage 18 at a predetermined resin pressure, e.g., about 100 kg per square cm, as shown in FIG. 4 curve (a). As the chief resin material passes by member 19 to the resin passage 18, it is divided into an inner layer and an outer layer. The output from die slit 21 is composed of chief resin material only. When the output single-layer parison portion composed only of the chief resin material is a predetermined length by the first plunger 30 being lowered a predetermined amount, the third plunger 15a is lowered by the lowering operation of the third extrusion cylindrical member 15b. In the example, at a time about 2.75 seconds, the adhesive resin within the third accumulator 15 is forcibly fed towards the junction of the resin materials (outlet of the nozzle) through the annular adhesive resin material conduits 34a and 34b by a predetermined resin pressure, e.g., about 100 kg per square cm, as shown in FIG. 4 curve (b). Just immediately after the third plunger is lowered, e.g., about 0.1 seconds, the second plunger 13a is lowered by the lowering operation of the second extrusion cylindrical member 13b. Therefore, the barrier resin material within the second accumulator 15 is forcibly fed toward the resin junction, by way of the barrier resin material conduit 37, the annular slit 38 and the nozzle 40 by the predetermined resin pressure shown in FIG. 4 curve (c), e.g., about 100 kg per square cm. Therefore, the barrier resin material and the adhesive resin extruded from the respective nozzles 40, 39a and 39b are supplied between the chief inner resin layer and the chief outer resin layer divided by the ringed member 19. Accordingly, adhesive inner and outer resin layers extruded from the nozzles 39a and 39b are disposed between the chief inner resin layer and the chief outer resin layer with barrier resin layer 3 extruded from the nozzle 40 disposed between the adhesive inner and outer resin layers. In FIG. 3, the chief resin outer layer is 1, the chief resin inner layer is 2, the inner and outer adhesive layers are 4b and 4a, respectively, and the barrier layer is 3.

When the multi-layer parison is extruded a predetermined length, e.g., time about 8.5 seconds, the supply of the barrier resin material is stopped by stopping the lowering operation of the second plunger 13a reducing the pressure effectively to zero. At the same time, the extrusion pressure of the adhesive resin is raised by a predetermined amount, e.g., to about 130 kg per square cm, by the lowering operation of the third plunger 13a as shown in FIG. 4 curve (b). The aforementioned predetermined length is preselected such that the most upstream portion of the barrier resin material is positioned just below the upper pinch portion 26a of the mold 23 as shown in FIG. 3.

When the pressure is raised as noted, the inner and outer adhesive resin layers are forced inwardly, cutting off the barrier resin layer. This effect is also due to the restriction pressure of the chief inner and outer resin layers. Next, the lowering operation of the third plunger 15a is stopped as shown in FIG. 4 curve (b), e.g., at time about 8.9 seconds, and then a little after, e.g., at time about 10.5 seconds, the lowering operation of the ringed piston 11 is stopped as shown in FIG. 4 curve (a).

The multi-layer parison extruded from the accumulator head 5 is held by the mold halves 24. Thereafter, the hollow article is made as shown in FIG. 2 by pressurized gas being blown into the cavity 25 as the mold 23 is closed. When the mold 23 is closed, the upstream end of the barrier resin material, that is, where it was cut off, is disposed just below the upper pinch portions 26a of the mold 23. Therefore, the material above the upper pinch portion 26a of the mold 23 includes the chief resin material and the adhesive resin only. The material below the lower pinch portion 26b of the mold 23 includes the chief resin material only.

The hollow article A (FIG. 2) molded in the blow mold 23 is taken out from the mold 23 after the mold is opened. The hollow article A taken out has upper and lower flashes 28a and 28b. The upper flash 28a includes the chief resin material and the adhesive resin which is composed of a modified form of the chief resin material and has the same quality. The lower flash 28b includes the chief resin material only. The hollow article is finished by cutting off the flashes 28a and 28b. The collected flashes 28a and 28b are recycled and used as part of the chief resin material. In this case, the flash 28a includes the adhesive resin, however, the adhesive resin, for example, is a modified polyethylene composed of the chief resin material for example, high-density polyethylene of the same quality. Therefore, its use does not affect or impair the transparence or the mechanical strength of the transparent hollow article.

Figure 6A:
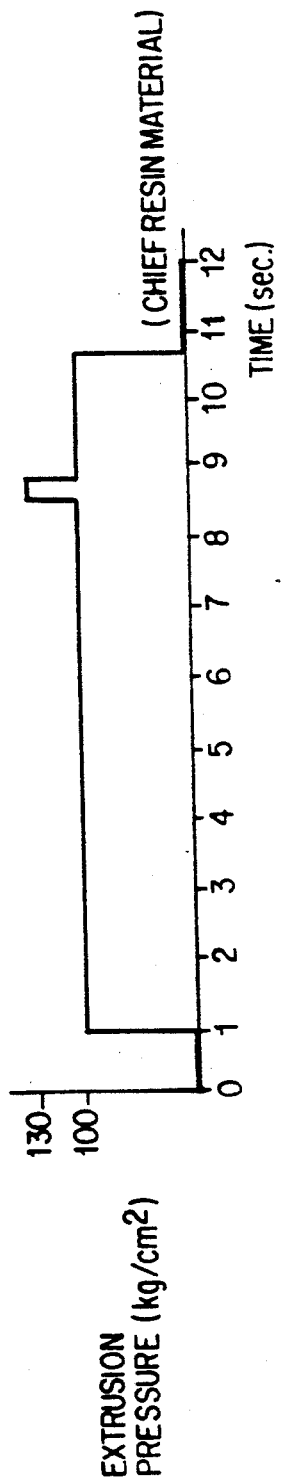
FIGS. 6A, B, and C are timing charts similar FIGS. 4A, B, and C showing a modification thereof.
Figure 6B:
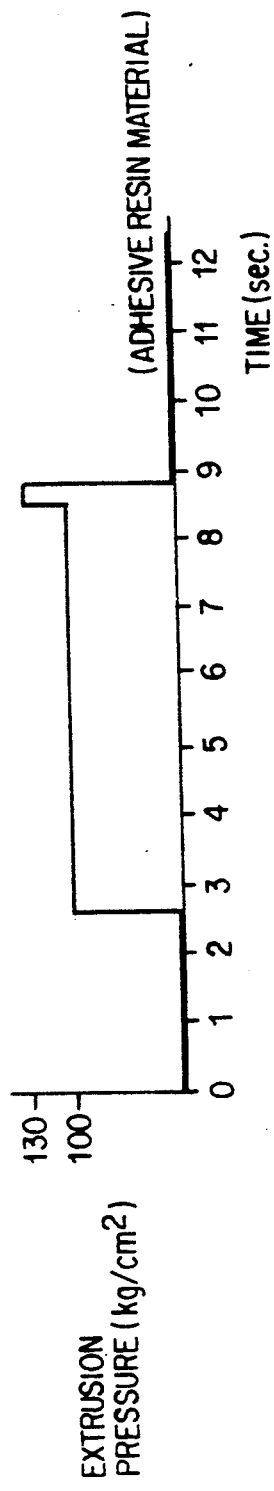
Figure 6C:
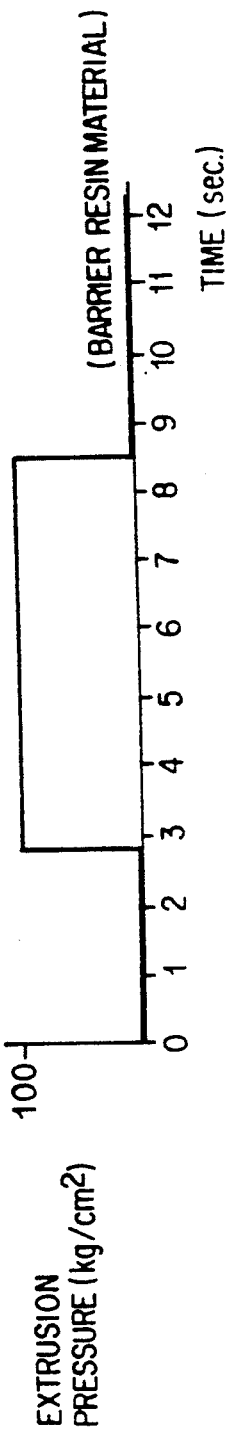

In the above described embodiment, the barrier resin material layer is cut off when the extrusion pressure of the adhesive material is raised. To obtain a more effective cut off, the extrusion pressure of the chief resin material can be raised as shown in FIG. 6 curve (a), e.g., to about 130 kg per square cm, at the same time that the extrusion pressure of the adhesive resin is raised, curve (b).

Moreover, although the above described embodiments use detecting means 15c as position sensor for the plunger 15a, the plunger 15a of the present invention can be connected to a timer means or the like and be actuated in response to a predetermined time interval.

Also, although the above described embodiments describe the extrusion molding equipment for the multi-layer parison as having the construction suitable to extrude three kinds of resin materials to obtain a five-layered article, the method of the manufacturing of the present invention can be adapted to multi-layer parison having the construction of at least three kinds of resin material extruded as three layers composed of a sub resin material layer being bonded to a chief resin material layer by an adhesive resin layer.

As examples of the chief resin, one may use polyethylene known in the trade as SHOLEX 4551 H supplied by Showa Denko K.K. (preferred), LUPOLEX 4261A supplied by BASF, ELTEX RS B71 supplied by Solvay, MARLEX BHB5003 or HXM 50100 supplied by Phillips Petroleum and Hi-ZEY 8200B supplied by Mitsui Petrochemical Industries, Ltd. As examples of the nylon sub resin, one may use CM 1066 (preferred) and CM 1061 both supplied by Toray Industries, Inc. As examples of the modified polyethylene adhesive resin, one may use SHOLEX ER (preferred) supplied by Showa Denko K.K. also described in Japanese Patent P62-94922, ADMER GT-3 supplied by Mitsui Petrochemical Industries, and N polyer supplied by Nippon Petrochemical Co. Ltd.

Although the present invention has been fully described by way of example with reference to the accompanying drawings, it is to be noted that various changes and modifications will be apparent to those skilled in the art. Such changes and modifications as do not depart from the scope of the present invention are construed as being included herein.

What is claimed is:

1. A method of manufacturing a multi-layer hollow article which comprises the steps of:
   (a) extruding a multi-layer parison by
      (i) feeding a molten chief resin material to an annular resin passage in an extrusion head at a chief resin extrusion pressure,
      (ii) dividing said chief resin material into at least two chief resin layers in the annular resin passage,
      (iii) feeding a molten adhesive resin material and a molten sub resin barrier material into the annular passage at an adhesive resin extrusion pressure and a sub resin barrier extrusion pressure, respectively, said adhesive resin material and said sub resin barrier material being fed into said annular passage such that a layered polymer material is formed having at least two layers of said chief resin material, a layer of said sub resin barrier material, said two layers of said adhesive resin material, each of the layers of adhesive resin material being located between one of the layers of the chief resin material and the sub resin barrier material and the layer of sub resin barrier material being sandwiched between two layers of adhesive resin material, the adhesive resin material being chemically related to the chief resin material, and
      (iv) extruding the layered polymer material through a die slit in a die attached to an exit portion of the extrusion head, the die slit being in fluid communication with the annular passage, to form the multi-layer parison;
   (b) reducing the sub resin barrier extrusion pressure to zero and, at the same time, raising the adhesive resin extrusion pressure by a predetermined amount and for a predetermined time to a raised adhesive resin extrusion pressure when the multi-layer parison has been extruded a predetermined length so that the sub resin barrier material layer is cut off completely;
   (c) reducing the adhesive resin extrusion pressure from said raised adhesive resin extrusion pressure to zero after said predetermined time has passed;
   (d) molding the multi-layer parison so that an upstream cut off end of the sub resin barrier material layer is positioned just within a molding space;
   (e) collecting flash, produced as said multi-layer parison is molded, from the molding; and
   (f) recycling the flash for use as part of the chief resin material.

2. A method according to claim 1, wherein when the adhesive resin extrusion pressure is raised, the chief resin extrusion pressure is raised.

3. A method according to claim 1, wherein the chief resin material is composed of high-density polyethylene and the adhesive resin is composed of a modified polyethylene.

4. A method according to claim 3 wherein the sub resin barrier material is nylon.

5. A method according to claim 1, wherein the layers of the chief resin material are thicker than the layers of the adhesive resin material.

6. A method according to claim 1, wherein the chief resin extrusion pressure is maintained at a predetermined level while cutting off the layer of the sub resin barrier material.

7. A method according to claim 1, further comprising the step of raising the chief resin extrusion pressure at the same time as the adhesive resin extrusion pressure is raised.

* * * * *